US012059896B2

(12) United States Patent
Tse et al.

(10) Patent No.: US 12,059,896 B2
(45) Date of Patent: Aug. 13, 2024

(54) COMBINED ELECTROHYDRODYNAMIC AND AEROSOL PRINTING

(71) Applicant: The Regents of the University of Michigan, Ann Arbor, MI (US)

(72) Inventors: Lai Yu Leo Tse, Ann Arbor, MI (US); Kira Barton, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 18/020,070

(22) PCT Filed: Aug. 4, 2021

(86) PCT No.: PCT/US2021/044571
§ 371 (c)(1),
(2) Date: Feb. 6, 2023

(87) PCT Pub. No.: WO2022/031866
PCT Pub. Date: Feb. 10, 2022

(65) Prior Publication Data

US 2023/0302794 A1 Sep. 28, 2023

Related U.S. Application Data

(60) Provisional application No. 63/060,840, filed on Aug. 4, 2020.

(51) Int. Cl.
*B41J 2/095* (2006.01)

(52) U.S. Cl.
CPC ............ *B41J 2/095* (2013.01); *B41J 2202/02* (2013.01)

(58) Field of Classification Search
CPC ..... B41J 2/095; B41J 2/005; B41J 2/06; B41J 2202/02; B41J 2/11
See application file for complete search history.

(56) References Cited

U.S. PATENT DOCUMENTS 5,396,273 A 3/1995 Stamer
6,554,410 B2 * 4/2003 Jeanmaire .................. B41J 2/09 347/77

(Continued)

FOREIGN PATENT DOCUMENTS

CN 103147138 A 6/2013
JP H03182357 A 8/1991

(Continued)

OTHER PUBLICATIONS

International Search Report for PCT/US2021/044571, dated Nov. 22, 2021, 3 pages.

(Continued)

*Primary Examiner* — Kristal Feggins
(74) *Attorney, Agent, or Firm* — Reising Ethington P.C.

(57) ABSTRACT

A printer having: an ink nozzle; an extractor laterally spaced from the ink nozzle; a plurality of gas nozzles arranged around the ink nozzle; and three modes of operation, including an electrohydrodynamic mode, an aerodynamic mode, and a combined mode. The modes operate as follows: a voltage is applied across the ink nozzle and the extractor in the electrohydrodynamic mode; a jet of gas is discharged from each of the gas nozzles in the aerodynamic mode; and the voltage is applied and the jets of gas are discharged in the combined mode.

20 Claims, 2 Drawing Sheets

(56) References Cited

U.S. PATENT DOCUMENTS

| | | | |
|---|---|---|---|
| 7,658,478 | B2 | 2/2010 | Steiner et al. |
| 7,992,975 | B2 | 8/2011 | Steiner et al. |
| 8,567,938 | B2 | 10/2013 | Tombs |
| 8,573,736 | B2 | 11/2013 | Ohnishi |
| 8,690,312 | B2 | 4/2014 | Tombs |
| 8,777,394 | B2 | 7/2014 | Tombs |
| 8,780,147 | B2 | 7/2014 | Tombs |
| 9,017,537 | B2 | 4/2015 | Adiga |
| 9,415,590 | B2 | 8/2016 | Barton et al. |
| 9,987,640 | B2 | 6/2018 | Herre et al. |
| 2006/0092230 | A1 | 5/2006 | Steiner et al. |
| 2010/0103228 | A1 | 4/2010 | Steiner et al. |
| 2011/0310179 | A1 | 12/2011 | Ohnishi |
| 2013/0076828 | A1 | 3/2013 | Tombs |
| 2013/0076843 | A1 | 3/2013 | Tombs |
| 2013/0076844 | A1 | 3/2013 | Tombs |
| 2013/0076847 | A1 | 3/2013 | Tombs |
| 2013/0077998 | A1 | 3/2013 | Tombs |
| 2013/0077999 | A1 | 3/2013 | Tombs |
| 2014/0262972 | A1 | 9/2014 | Adiga |

FOREIGN PATENT DOCUMENTS

| | | | |
|---|---|---|---|
| JP | 2010195008 | A | 9/2010 |
| JP | 2016513027 | A | 5/2016 |
| JP | 2016155302 | A | 9/2016 |

OTHER PUBLICATIONS

Written Opinion for PCT/US2021/044571, dated Nov. 22, 2021, 4 pages.

Japanese Office Action from corresponding Japanese Patent Application No. 2023-507754, dated Dec. 5, 2023, 5 pages (3 pages office action, 2 pages translation).

English Machine Translation of Japanese Office Action corresponding to companion JP application 2023-507754, dated Apr. 2, 2024, 2 pages.

* cited by examiner

COMBINED ELECTROHYDRODYNAMIC AND AEROSOL PRINTING

TECHNICAL FIELD

The present disclosure relates generally to printing and is particularly applicable to printers capable of electrohydrodynamic printing.

BACKGROUND

Printing has evolved from a technique for producing readable text and graphic images to a useful additive manufacturing process when adapted to deposit materials other than traditional pigments or dyes. Electrohydrodynamic printing, also known as e-jet printing, is a printing technique that relies on an electric field to extract droplets of a charged or polarized printing fluid from a printing nozzle and is capable of very high-resolution printing compared to other drop-on-demand printing methods with droplet size and spatial accuracy on a sub-micron or nanometer scale. Early e-jet printing was limited to electrically conductive printing surfaces because the printing surface was one of the electrodes between which the electric field was produced. Consistency with the electric field was also problematic due to the deposited ink causing interference with the field as printing progressed. U.S. Pat. No. 9,415,590 to Barton, et al. addressed these and other problems via clever ink extraction and directing techniques that did not rely on a conductive printing surface.

SUMMARY

In accordance with one aspect of the invention there is provided a printer configured to generate an extraction field that extracts printing fluid from an ink nozzle for deposition on a printing surface, wherein the extraction field is changeable among an electric field, a gas flow field, and a combination of an electric field and a gas flow field.

The printer may include any one or more of the following features, either individually or in any technically feasible combination.

- The printer further comprises an extractor, wherein the electric field is generated by a voltage applied across the ink nozzle and the extractor. Optionally, the extractor is laterally spaced from the ink nozzle.
- The printer further comprises at least one gas nozzle, wherein the gas flow field is generated by a jet of gas being discharged from each gas nozzle. Optionally:
  - the printer further includes an extractor, wherein the electric field is generated by a voltage applied across the ink nozzle and the extractor, and, further optionally, said combination is generated by a voltage applied across the ink nozzle and the extractor simultaneously with the jet of gas being discharged from each gas nozzle; or
  - the at least one gas nozzle is a plurality of gas nozzles and, optionally, the printer further includes an extractor, wherein the electric field is generated by a voltage applied across the ink nozzle and the extractor, and, further optionally, wherein only one of the plurality of gas nozzles discharges the jet of gas when the extraction field is the electric field.

In accordance with another aspect of the invention there is provided a printer that comprises: an ink nozzle; an extractor laterally spaced from the ink nozzle; a plurality of gas nozzles arranged around the ink nozzle; and three modes of operation, including an electrohydrodynamic mode, an aerodynamic mode, and a combined mode. The modes have the following attributes: a voltage is applied across the ink nozzle and the extractor in the electrohydrodynamic mode; a jet of gas is discharged from each of the gas nozzles in the aerodynamic mode; and said voltage is applied and said jets of gas are discharged in the combined mode.

The printer of the preceding paragraph may include any one or more of the following features, either individually or in any technically feasible combination.

- The jet of gas is discharged from one or more of the gas nozzles in the electrohydrodynamic mode to direct extracted printing fluid toward a printing surface, and, optionally, the jet of gas is discharged from only one of the gas nozzles in the electrohydrodynamic mode.
- The ink nozzle comprises an extraction opening facing in a direction toward the extractor, and, optionally, the ink nozzle is beveled at the extraction opening.

BRIEF DESCRIPTION OF THE DRAWINGS

Preferred exemplary embodiments of the invention will hereinafter be described in conjunction with the appended drawings, wherein like designations denote like elements, and wherein.

DESCRIPTION OF EMBODIMENTS

Figure 2:
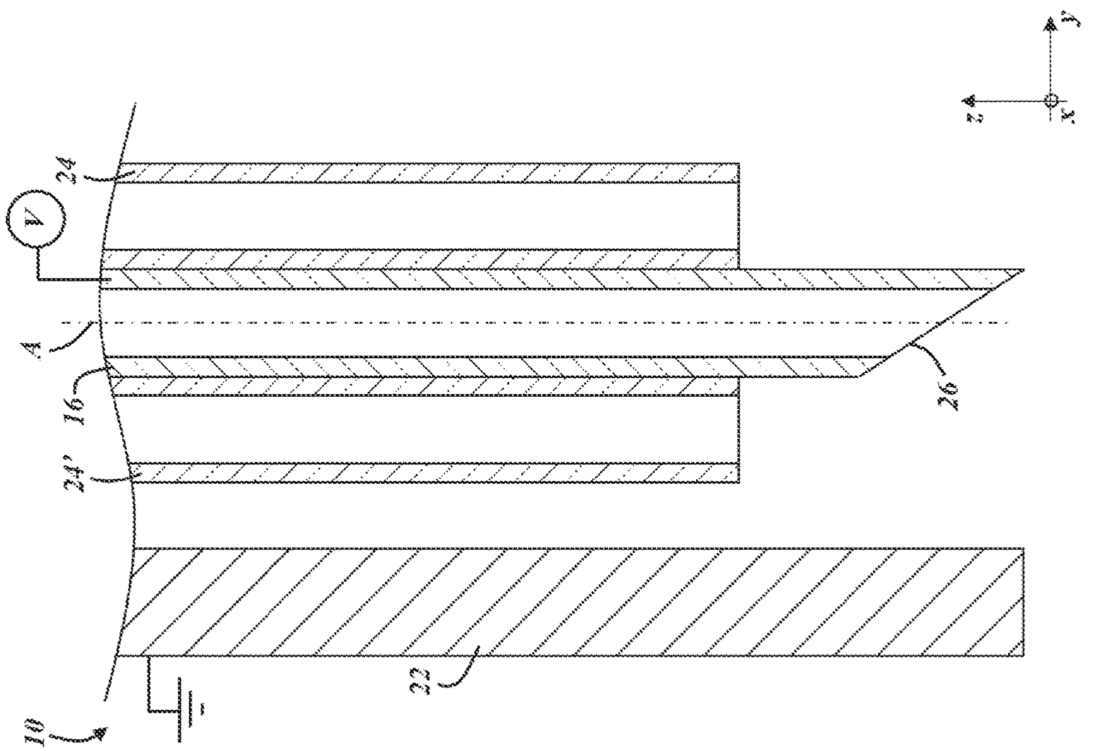
FIG. 2 is a cross-sectional view of the print head of FIG. 1.
Figure 1:
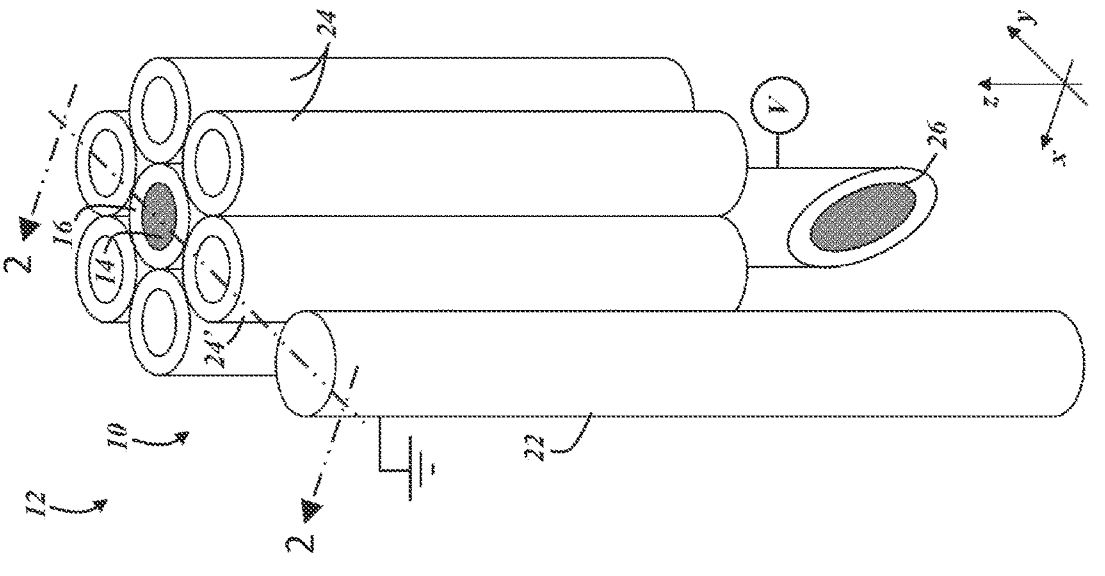
FIG. 1 is an isometric view of a portion of a multi-mode print head.

Described below is a printer capable of multi-mode printing where at least one mode employs an electric field of the type used for ink extraction in electrohydrodynamic printing. FIG. 1 schematically illustrates a portion of a print head 10 of a printer 12 configured to generate an extraction field that extracts printing fluid 14 from an ink nozzle 16 for deposition on a printing surface 18, such as a surface of a substrate 20 or a previously printed material (FIG. 2). As discussed further below, the extraction field is changeable among an electric field, a gas flow field, and a combination of an electric field and a gas flow field. Moreover, the extraction field is changeable and tunable via changes is process parameters only and without the need for changes in the physical components of the print head 10 or printer 12. Such a printer 12 offers process flexibility that is not attainable with single mode printers, such as changing between extremely accurate but relatively slower e-jet printing and less accurate but relatively faster aerosol printing during the same printing job.

With additional reference to the cross-sectional view of FIG. 2, the illustrated print head 10 includes the ink nozzle 16, an extractor 22, and one or more gas nozzles 24. These components are all configured to move together and/or remain stationary with respect to one another as part of the print head 10. The printer 12 may for example include a tray or carrier to which the print head 10 is affixed, along with a movement system configured to provide relative movement between the print head 10 and the printing surface such that the print head can be guided along a deposition pattern or path defined on the printing surface. Multi-axis movement systems for printers are generally known and may include axis-dedicated servos, guides, wheels, gears, belts, etc. A suitable movement system is disclosed by Barton et al. in U.S. Pat. No. 9,415,590. The movement system may be configured to translate and rotate the print head and/or the printing substrate along and about multiple axes to allow the print head to deposit printing fluid in any direction and along any path on substrates of all shapes. The print head 10 could be affixed to the end of a robotic arm, for example.

The ink nozzle 16 extends along a central axis (A) and has an extraction opening 26 at its distal end. The nozzle 16 is in fluidic communication with a source of the printing fluid 14 which may be controllably pressurized with a back pressure in a range from 5 psi to 30 psi (35-200 kPa) during operation and brought to zero when not printing. In the illustrated example, the ink nozzle 16 is beveled at its end such that the extraction opening 26 lies in an oblique plane and faces in a direction toward the extractor 22. This feature results in a meniscus of printing fluid 14 at the tip of the nozzle 16 that is non-symmetric about a central axis (in the z-direction) of the nozzle and skewed toward the extractor and into the path of one of the gas nozzles 24 when a back pressure is present, even in the absence of an extraction field.

The ink or printing fluid 14 is any fluid that flows under pressure and can be solidified after deposition. Solidification can be via various mechanisms, such as solvent evaporation, chemical reaction, cooling, or sintering. In some cases, the printing fluid 14 is a functional ink, which is a printing fluid that provides a function other than coloration once solidified on the surface on which it is printed. Examples of such functions include electrical conductivity, dielectric properties, physical structure (e.g., stiffness, elasticity, or abrasion resistance), electromagnetic shielding or filtering, optical properties, electroluminescence, etc.

The ink nozzle 16 is operatively connected with a controllable voltage source (V), which can be positive or negative, a pulsed or constant DC voltage, or an AC voltage. The voltage source (V) can also be deactivated or its connection to the nozzle 16 selectively interrupted. The ink nozzle 16 can be made from a conductive material (e.g., stainless steel) or a non-conductive material (e.g., plastic or glass). A non-conductive nozzle material can help prevent arcing between the nozzle 16 and the extractor 22. In some embodiments, the nozzle 16 is formed from a non-conductive material and has a conductive layer (e.g., copper plating) along its interior surface. In other embodiments, the nozzle 16 is formed from a conductive material and an electrically insulating layer is included between the nozzle 16 and extractor 22. Conductive portions of an otherwise non-conductive nozzle 16 can help distribute an applied charge to the printing fluid 14, but this is not always necessary.

The extractor 22 is spaced apart from the ink nozzle 16 such that an electric field is generated between the nozzle 16 and the extractor when a voltage potential is applied thereacross. In the illustrated example, the extractor 22 is laterally spaced from the ink nozzle 16 and at electrical ground with the applied voltage (V) at the ink nozzle 16. The extractor 22 may be formed from a metal rod or wire, as shown, or may be formed from another material with a metallic or otherwise conductive portion, particularly near its distal end so that the extraction opening 26 of the nozzle 16 is at least partly within the generated electric field.

The illustrated print head 10 has a plurality of gas nozzles 24. In this case, the gas nozzles 24 are tubes, each of which runs parallel with the ink nozzle 16 and which together surround the ink nozzle. One of the illustrated gas nozzles 24 is located between the ink nozzle 16 and the extractor 22 and is a dual-purpose nozzle 24' that can serve different purposes depending on the mode in which the printer 12 is operating. The printer 12 is configured to generate a gas flow field within which the extraction opening 26 of the nozzle 16 is located. The gas flow field is generated when a jet of gas is discharged from each of the gas nozzles 24. The gas nozzles 24 may be arranged directly adjacent the ink nozzle 16 as shown with the discharge end of each gas nozzle arranged along the outer surface of the ink nozzle such that the ink nozzle extends beyond the gas nozzles. Each gas nozzle 24 is in fluidic communication, individually or together, to a pressurized gas source with a controllable pressure and/or flow rate which can be selectively interrupted or otherwise shut off. An exemplary pressure range of the gas source is between 1 psi and 30 psi. The gas may be air, nitrogen, or an inert gas and in some cases may include a constituent (e.g., water vapor or a catalyst) that reacts with or otherwise conditions the extracted printing fluid. Where employed, the flow of gas from the dual-purpose nozzle 24' is separately controllable. The gas nozzles 24 may be formed from an electrically insulating material, such as plastic or glass, to help insulate the extractor 22 for the ink nozzle 16.

While the drawings are not necessarily to scale, some non-limiting dimensions of individual components of the print head 10 are provided below to give a general idea of the size scale of a working embodiment. As is apparent in the figures, the print head 10 can be made somewhat modular. For example, the ink nozzle 16, extractor 22, and gas nozzles 24 may all have a cylindrical configuration with the same or similar outer diameters. The extractor 22 can be made from a metal wire having a diameter in a range from 200 μm to 400 μm or, nominally, about 300 μm. The ink nozzle 16 can be made from a tube having an outer diameter in the same range and or the same diameter as the extractor 22. The inner diameter of the ink nozzle 16 may be in a range from 100 μm to 200 μm or, nominally about 150 μm. The discharge opening of each gas nozzle 24 may have a diameter greater than or equal to the diameter of the extraction opening 26 of the ink nozzle 16. In one embodiment, the ink nozzle 16 and each of the gas nozzles 24 are made from cut lengths of the same tubing. The respective distal ends of the ink nozzle 16 and extractor 22 may be at the same distance from the printing surface as shown in the figures, or the extractor may extend beyond the ink nozzle by 100 μm to 200 μm. And the z-distance between the discharge ends of the gas nozzles 24 and the end of the ink nozzle may be in a range from 200 μm to 300 μm.

Figure 3:
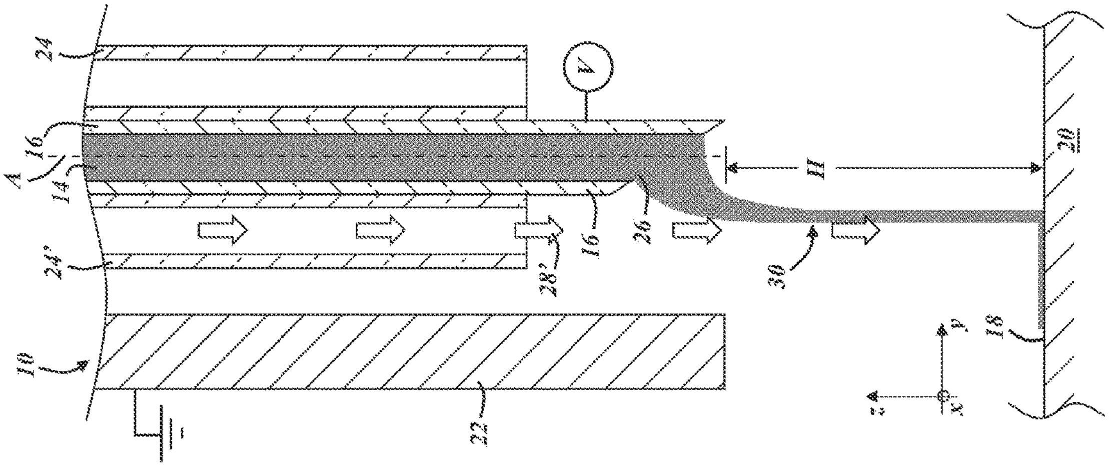
FIG. 3 schematically illustrates the print head of FIGS. 1 and 2 operating in an electrohydrodynamic mode.
Figure 4:
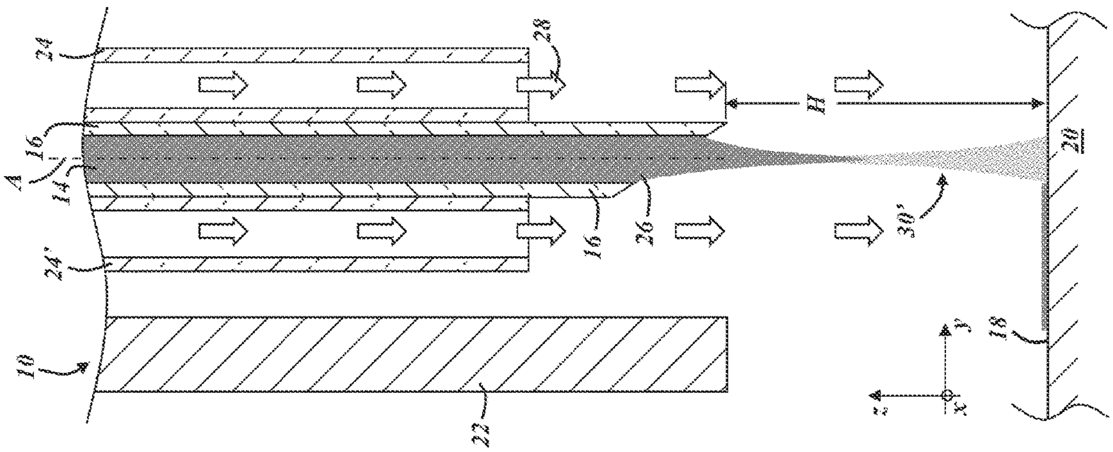
FIG. 4 schematically illustrates the print head of FIGS. 1-3 operating in an aerodynamic mode.
Figure 5:
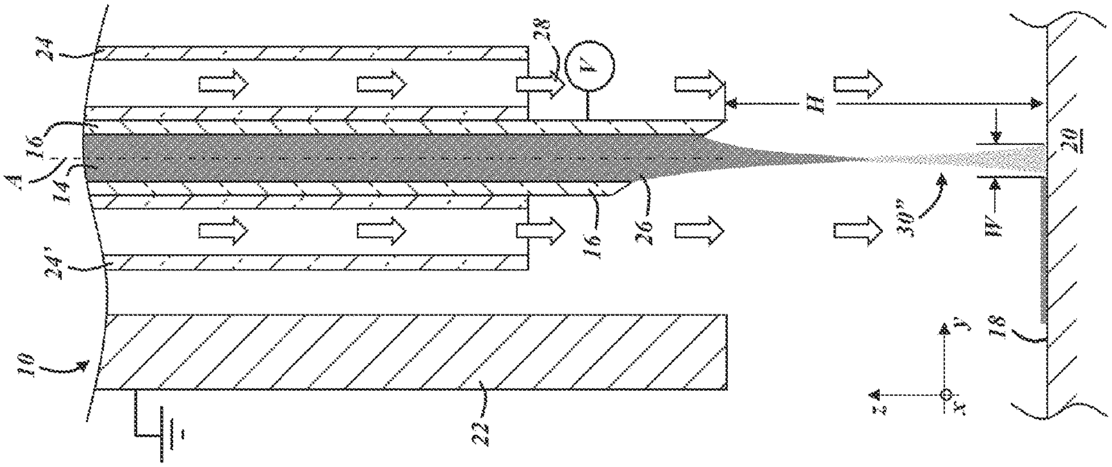
FIG. 5 schematically illustrates the print head of FIGS. 1-4 operating in a combined mode.

FIGS. 3-5 respectively illustrate the printer 12 in three different modes of operation. FIG. 3 illustrates an electrohydrodynamic mode, FIG. 4 illustrates an aerodynamic or aerosol mode, and FIG. 5 illustrates a combined mode.

In the electrohydrodynamic (or e-jet) mode of FIG. 3, the extraction field is the electric field generated between the extractor 22 and the ink nozzle 16. The e-jet mode is the most accurate and highest resolution mode. In this mode, the applied voltage (V) may be in a range from about 10V up to about 1000V with the extractor 22 at electrical ground. Depending on several factors, such as the size of the extraction opening, printing fluid viscosity, back pressure, and the ability of the printing fluid to be charged or polarized, a threshold voltage is sufficient to extract a droplet of the printing fluid 14 from the nozzle 16 via the attraction of the charged printing fluid toward the extractor 22. An exemplary range for the extraction voltage is between 300V and 1000V, such as between 400V and 700V. A baseline voltage which is insufficient to extract printing fluid from the nozzle 16 may be maintained in a range from 10V to 300V, such as between 200V and 300V, to keep a consistent meniscus (i.e., Taylor cone) available at the extraction opening 26 between extracted droplets of printing fluid.

As illustrated in FIG. 3, the dual-purpose gas nozzle 24' provides a jet of gas 28' in a direction toward the printing surface 18. The jet of gas 28' is only a portion of the gas flow field that the full plurality of gas nozzles 24 is able to provide and may be referred to as a directionality field, with its primary function being to direct extracted droplets of fluid toward the printing surface 18. The beveled end of the ink nozzle 16, with the extraction opening facing toward the extractor 22, promotes extraction of the printing fluid 14 in the desired direction—i.e., toward the extractor 22 and into the jet of gas 28'. In this mode, no jets of gas are required to be discharged from the other gas nozzles 24, as the gas flow field is not required for extraction of the printing fluid from the nozzle 16. The distance (H) from the ink nozzle 16 to the printing surface 18 may be in a range from 1 to 8 mm in this mode. The resulting stream 30 of printing fluid 14 is offset from the central axis (A) of the ink nozzle 16. The stream 30 of printing fluid 14 is depicted as a solid stream of fluid in FIG. 3 but may be composed of a series of individual droplets.

In the aerodynamic or aerosol mode of FIG. 4, the extraction field is the gas flow field generated between the gas nozzles 24 and the printing surface 18. In this printing mode, extraction of the printing fluid 14 from the nozzle 16 is driven solely by aerodynamics. No voltage is applied to the ink nozzle 16 (V=0), and the extractor 22 may be ungrounded (i.e., electrically floating). This is a lower resolution mode relative to the e-jet mode, but it may be considerably faster than the e-jet mode. Jets of gas 28 are discharged from all of the gas nozzles 24 to generate the gas flow field, which is generally symmetric about the axis (A) of the ink nozzle 16. The flow rate of the jets of gas 28 is sufficiently high to induce a low-pressure region at the end of the ink nozzle 16.

With the discharge opening 26 of the nozzle in the low-pressure region and back pressure on the printing fluid in the nozzle 16, printing fluid 14 is extracted from the nozzle 16 and subsequently atomized into an aerosol 30' comprising the discharged gas and dispersed droplets of extracted printing fluid. The aerosol is thus formed outside the ink nozzle 16, while the printing fluid 14 contained in the ink nozzle is in bulk liquid form. The aerosol mode may be tunable such that printing fluid extraction only occurs above a threshold value of ink nozzle back pressure. Printing fluid extraction can thus be halted and reinitiated by respectively reducing and increasing the backpressure while the jets of gas continuously flow. The distance (H) from the ink nozzle 16 to the printing surface 18 may be in a range from 3 to 30 mm in this mode. The resulting stream 30' of printing fluid 14 is generally symmetric about the nozzle axis (A), but its expansion into an aerosol make the width of the deposited printing fluid greater than that of the e-jet mode, such as in a range from 0.8 mm to 3 mm.

In the combined mode of FIG. 5, the extraction field is a combination of the electric field described in conjunction with FIG. 3 and the gas flow field described in conjunction with FIG. 4. The extractor 22 is grounded, the voltage (V) is applied at the ink nozzle 16, and jets of gas 28 are discharged from all of the gas nozzles 24. This mode may be viewed as an electric-assist mode with the resulting stream 30" of printing fluid being in aerosol form. However, with printing fluid extraction being assisted by electrohydrodynamics, a lower gas source pressure can be used so that the flow rate of the jets of gas 28 is lower than in the aerosol mode—i.e., with assistance from the electric field between the nozzle 16 and extractor 22, the pressure in the low pressure region created by the gas flow field does not have to be as low. The result is less expansion of the printing fluid 14 when atomized and a smaller width (W) of the deposited printing fluid. The reduced flow rate of the jets of gas 28 can also result in a reduction in the amount of atomized printing fluid released into the environment (i.e., not deposited on the printing surface), which is particularly useful with hazardous printing fluids and improves the overall material usage efficiency.

The above description and the appended figures are merely exemplary, and printers may be constructed and used to realize the benefits of this disclosure with various other combinations of components. For example, the print head and/or printer may include multiple ink nozzles and corresponding extractors and gas nozzles. Also, there need only be one gas nozzle to provide a gas flow field sufficient for printing fluid extraction—e.g., a single gas nozzle concentric with and surrounding the ink nozzle may suffice and may serve to provide the directionality field in e-jet mode. As another example, neither the gas nozzle(s) nor the extractor need be parallel with the ink nozzle. In some embodiments, the working part of the extractor that defines one end of the electric field extends horizontally, for example. And in some embodiments, the gas nozzles are angle inwardly toward the ink nozzle axis. Countless other variations are possible.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A printer configured to generate an extraction field that extracts printing fluid from an ink nozzle for deposition on a printing surface, wherein the extraction field is changeable among an electric extraction field with no gas flow extraction field, a gas flow extraction field with no electric extraction field, and a combination of an electric extraction field and a gas flow extraction field.

2. The printer of claim 1, further comprising an extractor, wherein the electric extraction field is generated by a voltage applied across the ink nozzle and the extractor.

3. The printer of claim 2, wherein the extractor is laterally spaced from the ink nozzle.

4. The printer of claim 2, wherein the ink nozzle comprises an extraction opening facing in a direction toward the extractor.

5. The printer of claim 4, wherein the ink nozzle is beveled at the extraction opening.

6. The printer of claim 1, further comprising at least one gas nozzle, wherein the gas flow extraction field is generated by a jet of gas being discharged from each gas nozzle.

7. The printer of claim 6, further comprising an extractor, wherein the electric extraction field is generated by a voltage applied across the ink nozzle and the extractor.

8. The printer of claim 7, wherein said combination is generated by a voltage applied across the ink nozzle and the extractor simultaneously with the jet of gas being discharged from each gas nozzle.

9. The printer of claim 6, wherein the at least one gas nozzle is a plurality of gas nozzles.

10. The printer of claim 9, further comprising an extractor, wherein the electric extraction field is generated by a voltage applied across the ink nozzle and the extractor.

11. The printer of claim 10, wherein only one of the plurality of gas nozzles discharges the jet of gas when the extraction field is the extraction electric field.

12. A printer, comprising:

an ink nozzle;

an extractor laterally spaced from the ink nozzle;

a plurality of gas nozzles arranged around the ink nozzle; and three modes of operation, including an electrohydrodynamic mode, an aerodynamic mode, and a combined mode, wherein:

a voltage is applied across the ink nozzle and the extractor and no gas is discharged from at least one of the gas nozzles in the electrohydrodynamic mode, a jet of gas is discharged from each of the gas nozzles and no voltage is applied across the ink nozzle and the extractor in the aerodynamic mode, and said voltage is applied and said jets of gas are discharged in the combined mode.

13. The printer of claim 12, wherein the jet of gas is discharged from one or more of the gas nozzles in the electrohydrodynamic mode to direct extracted printing fluid toward a printing surface.

14. The printer of claim 13, wherein the jet of gas is discharged from only one of the gas nozzles in the electrohydrodynamic mode.

15. The printer of claim 12, wherein the ink nozzle comprises an extraction opening facing in a direction toward the extractor.

16. The printer of claim 15, wherein the ink nozzle is beveled at the extraction opening.

17. A printer configured to generate an extraction field that extracts printing fluid from an ink nozzle for deposition on a printing surface, wherein the extraction field is changeable among an electric field, a gas flow field, and a combination of an electric field and a gas flow field, the printer further comprising a plurality of gas nozzles and an extractor, wherein the gas flow field is generated by a jet of gas being discharged from each gas nozzle, wherein the electric field is generated by a voltage applied across the ink nozzle and the extractor, and wherein only one of the plurality of gas nozzles discharges the jet of gas when the extraction field is the electric field.

18. The printer of claim 17, wherein the extractor is laterally spaced from the ink nozzle.

19. The printer of claim 18, wherein the ink nozzle is beveled at the extraction opening.

20. The printer of claim 17, wherein the ink nozzle comprises an extraction opening facing in a direction toward the extractor.

* * * * *